(12) United States Patent
Yamashita et al.

(10) Patent No.: US 7,520,652 B2
(45) Date of Patent: Apr. 21, 2009

(54) AREA LIGHT SOURCE

(75) Inventors: Tomoyoshi Yamashita, Kanagawa (JP); Yasuko Hayashi, Oita (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 53 days.

(21) Appl. No.: 10/543,607

(22) PCT Filed: Jan. 26, 2004

(86) PCT No.: PCT/JP2004/000646

§ 371 (c)(1),
(2), (4) Date: Jul. 28, 2005

(87) PCT Pub. No.: WO2004/076917

PCT Pub. Date: Sep. 10, 2004

(65) Prior Publication Data

US 2006/0056200 A1 Mar. 16, 2006

(30) Foreign Application Priority Data

Jan. 29, 2003 (JP) ............................. 2003-020564

(51) Int. Cl.
*F21V 7/04* (2006.01)
(52) U.S. Cl. ...................... 362/608; 362/633
(58) Field of Classification Search ................. 362/608, 362/633, 26, 27, 30, 600, 606, 609, 610, 362/611, 612, 613, 614, 615, 617, 619, 620, 362/623, 624, 626, 632, 634, 561, 579, 800, 362/812
See application file for complete search history.

(56) References Cited

U.S. PATENT DOCUMENTS 5,280,372 A * 1/1994 Horiuchi ...................... 349/65
5,883,684 A * 3/1999 Millikan et al. ............... 349/65
6,016,175 A * 1/2000 Kim ............................ 349/58

(Continued)

FOREIGN PATENT DOCUMENTS

JP 6-174934 6/1994

(Continued)

*Primary Examiner*—Hargobind S Sawhney
(74) *Attorney, Agent, or Firm*—Morgan, Lewis & Bockius LLP (57) ABSTRACT

An area light source comprising an LED primary light source (2), a plate-like light guide (4) and a light deflector (6) is provided with a direct light incoming prevention means closed of a light-blocking member (9). The light guide (4) has a light incoming end face (41) and a light outgoing face (43) and guides a light emitted from the LED primary light source (2). The light deflector (6) is arranged adjacently to the light outgoing face (43) and has a light entering face (61) and a light exiting face (62). The direct light incoming prevention means prevents a light, which is emitted from the LED primary light source (2), from entering into the light deflector (6) without passing through the light guide (4). The light-blocking deflector (9) is disposed on a first region of the light outgoing face (43) which is located near the edge of the light incoming end face side of the light outgoing face (4). The surface of the light-blocking member (9) facing the light outgoing face (43) is a diffusing reflective surface. The light deflector (6) is disposed on a second region of the light outgoing face (43) where the light-blocking member (9) is not arranged.

15 Claims, 6 Drawing Sheets

U.S. PATENT DOCUMENTS

| | | | |
|---|---|---|---|
| 6,123,430 A * | 9/2000 | Ono et al. | 362/608 |
| 6,435,685 B2 * | 8/2002 | Matsushita | 362/608 |
| 6,572,236 B2 * | 6/2003 | Suzuki et al. | 362/600 |
| 6,611,304 B2 * | 8/2003 | Itoh et al. | 349/65 |

FOREIGN PATENT DOCUMENTS

| | | | | |
|---|---|---|---|---|
| JP | 7-270624 | | | 10/1995 |
| JP | 8-94848 | | | 4/1996 |
| JP | 08101311 | A | * | 4/1996 |
| JP | 08190021 | A | * | 7/1996 |
| JP | 8-327828 | | | 12/1996 |
| JP | 10-112214 | | | 4/1998 |
| JP | 10282911 | A | * | 10/1998 |
| JP | 2001006419 | A | * | 1/2001 |
| JP | 2001060071 | A | * | 3/2001 |
| JP | 2001143511 | A | * | 5/2001 |
| JP | 2001-312213 | | | 11/2001 |

* cited by examiner

AREA LIGHT SOURCE

TECHNICAL FIELD

The present invention relates to a planar light source device of an edge light system, and more particularly to a planar light source device or area light source designed to realize miniaturization and a reduction in power consumption. The planar light source device of the present invention is suitably applied to a backlight, which uses a point light source such as a light emitting diode (LED), of a relatively compact liquid crystal display device used as a display panel of a portable electronic device such as a cellular phone, or an indicator of various devices.

BACKGROUND ART

Recently, the liquid crystal display device has been in wide use as a monitor for a portable notebook personal computer or the like, or a display section for a liquid crystal television, a video integrated liquid crystal television or the like, and in various other fields. The liquid crystal display device basically comprises a backlight section and a liquid crystal display element section. As the backlight section, a type of an edge light system has frequently been used with a view to making the liquid crystal display device compact.

Conventionally, as a backlight, a type has been, in wide use in which at least one end face of a rectangular plate-like light guide is used as a light incident end face or light incoming end face, a linear or bar-shaped primary light source such as a straight tube fluorescent lamp is arranged along the light incident end face, a light emitted from the primary light source is introduced into the light guide through the light incident end face thereof, and the light is emitted from a light emitting face or light outgoing face which is one of two principal surfaces of the light guide. The light emitted from the light emitting face of the light guide predominantly has a direction of angle of 45° or less relative to the light emitting face. Therefore, a prism sheet is arranged on the light emitting face of the light guide so that the light is deflected to a required direction, e.g. a normal direction of the light emitting face.

Meanwhile, there has recently been made a demand for miniaturization and a reduction in power consumption regarding liquid crystal display devices of relatively small screen sizes such as portable electronic devices, e.g., cellular phones, portable game machines, etc., or indicators of various electric devices or electronic devices. Thus, an LED that is a point light source is used as the primary light source of the backlight in order to reduce power consumption. As the backlight that uses the LED as the primary light source, an example is described in JP(A)-7-270624 in which a plurality of LED's are one dimensionally arrayed along the light incident end face of the light guide in order to exhibit a function similar to that of the backlight which uses the linear primary light source. The use of the primary light source based on the one-dimensional arrangement of the plurality of LED's enables acquisition of a required light amount and uniformity of a luminance distribution on an entire screen.

In case of the backlight for use in the portable electronic devices, lightening and thinning of the devices have been strongly demanded. Therefore, the thickness of the light guide is generally set to a smaller value than that of the conventional backlight. In such a case, it may happen that a portion of the LED is positioned beyond the edge of the light incident end face of the light guide, that is, protrudes across a level of the light emitting face in the light emitting direction across a level of the light emitting face. The light emitted from the portion of the LED positioned beyond the edge of the light incident end face may directly enter the light deflecting prism sheet without passing through the light guide, i.e. without falling on the light incident end face. Such a dirty incident light is emitted from the prism sheet in a direction different from that of a normal case where the light is emitted from the light emitting face of the light guide and introduced into the prism sheet, to thereby cause a bright line observed in planar light emission, which has been desired to be eliminated.

Figure 12:
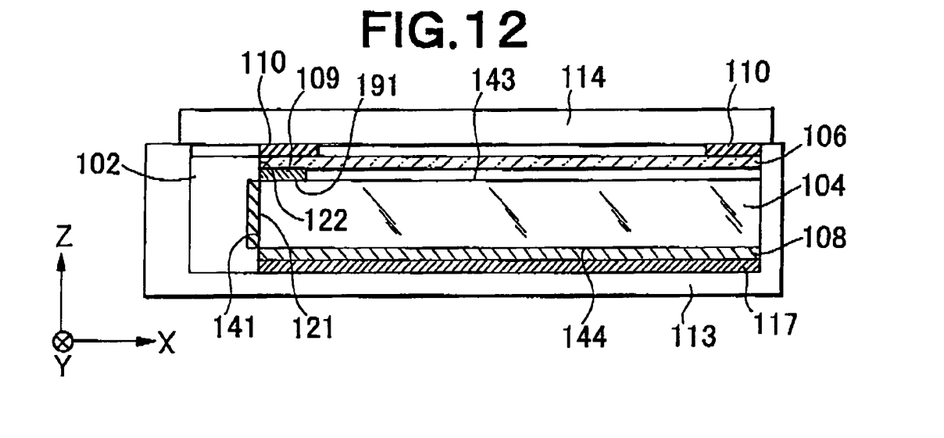
FIG. 12 is a schematic cross-sectional view showing a planar light source device.

In order to block the above-mentioned light which is introduced directly into the prism sheet from the LED, it may be designed that a light-blocking member is disposed on the light emitting face of the light guide in an end region on the side of the light incident end face, and the light deflecting prism sheet is disposed thereon. FIG. 12 is a schematic cross-sectional view of a planar light source device having such a configuration. In FIG. 12, an LED 102 is arranged so as to face a light incident face 141 of a light guide 104. The LED 102 has a lighting portion 121 and a non-lighting portion 122. A light reflector 108 is arranged below a lower face 144 of the light guide 104. A light blocking-member 109 is arranged on an upper surface or light emitting face 143 of the light guide 104 in an end region on the side of the light incident end face 141. A light deflecting prism sheet 106 is arranged over the upper surface or light emitting face 143 of the light guide 104 with the light blocking-member 109 interposed therebetween. The above constituent members are set in a casing 113. A lid 114 of light transparency is attached to the casing 113. There is provided on a lower surface of the lid 114 a pressing member 110 by which an end region of an upper surface of the prism sheet 106 is pressed toward the light guide 104.

Figure 13:
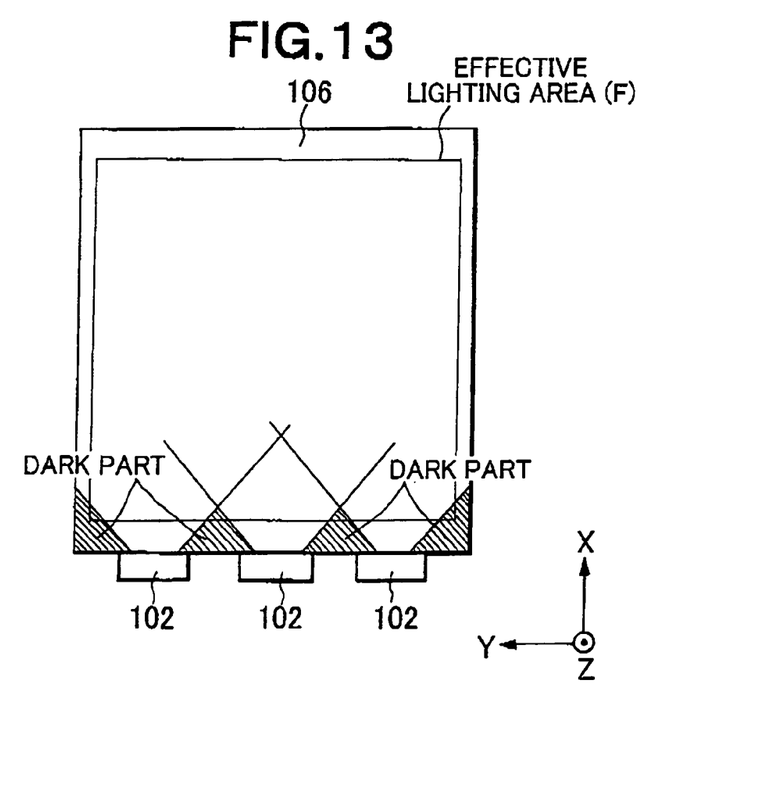
FIG. 13 is a view showing appearance of the dark part in the planar light source device.

In such a case, however, there is caused a gap between the light guide 104 and the prism sheet 106 at a region of the light emitting face of the light guide other than the end region thereof on the side of the light incident end face. Accordingly, there is the following problem. That is, as compared with a case of no gap, i.e. a case where the light emitting face of the light guide and the prism sheet are in close contact with each other, there is caused a longer dark shadows or dark parts appearing at outside portions of both ends of a one-dimensional arrangement of a plurality of LED's 102 and at an intermediate portion between the adjacent LED's as shown in FIG. 13. Such dark shadows or dark parts are easily observed within an effective lighting area F, i.e. a lighting area contributing to irradiation of display screen of a liquid crystal display device constituted with a combination of the planar light source device and a liquid crystal display element, of the planar light source device, which corresponds to the display screen of the liquid crystal display device.

Additionally, in a case where the lighting portion of the LED is partly located higher than the upper edge of the light incident end face of the light guide, i.e. the edge thereof on the light emitting face side, there is another problem that luminance becomes lower because the light emitted from the LED is not efficiently introduced into the light guide.

On the other hand, there is proposed a planer light source device having a linear light source such as a cold cathode tube as the primary light source in which an edge of a reflector for the primary light source is extended to cover the end region of the light emitting face of the light guide on the side of the light incident end face, to thereby block the light emitted from the end region of the light emitting face, as described in JP (A)-6-174934 or JP (A)-8-94848. However, these publications do neither suggest the above-mentioned problem that the dark shadows or dark parts are easily observed within the effective lighting area of the planar light source device at the intermediate portion between the adjacent LED's or the like when using the point light source such as LED as the primary light source, nor suggest measure against such a problem.

Furthermore, there is proposed a planer light source device having a linear light source such as a cold cathode tube as the primary light source in which an edge of a reflector for the primary light source or edge of the lid attached to the casing is extended to an end region of the light incident end face of the light guide, to thereby block the light directly incident on an end face of the prism sheet, as described in JP(A)-8-327828. However, these publications also do neither suggest the above-mentioned problem that the dark shadows or dark parts are easily observed within the effective lighting area of the planar light source device at the intermediate portion between the adjacent LED's or the like when using the point light source such as LED as the primary light source, nor suggest measure against such a problem. In addition, in this planar light source device, since the end region of the light incident end face of the light guide is covered with the edge of the reflector or edge of the lid, there is also the above problem that the light emitted from the primary light source is not efficiently introduced into the light guide and therefore the luminance becomes lower.

Furthermore, for the portable electronic devices such as cellular phones, etc., lightening of the devices have been more and more demanded so that it has been proposed to eliminate the above-mentioned casing for setting the constituent members therein. With the constitution proposed in the above JP(A)-6-174934, JP(A)-8-94848 or JP(A)-8-327828, if the casing is eliminated, there is formed a gap between the light guide and the prism sheet also at the end portion of the prism sheet. Accordingly, there is a problem that the light entered the gap between the light guide and the prism sheet is introduced into the prism sheet and emitted therefrom in an oblique direction, to thereby cause the bright line, in addition to the problem that the dark shadows or dark parts are easily observed within the effective lighting area of the planar light source device at the intermediate portion between the adjacent LED's or the like.

DISCLOSURE OF THE INVENTION

An object of the present invention is to provide a high-quality planar light source device capable of avoiding appearance of the bright line and appearance of the dark part at an area between the adjacent LED's, etc. observed within the effective lighting area of the planar light source device, and of efficiently introducing the light emitted from the primary light source such as LED, etc. into the light guide, even if the light guide is made thin and light.

According to the present invention, in order to achieve the above object, there is provided a planar light source device comprising:

a primary light source;

a light guide guiding a light emitted from the primary light source and having a light incident end face on which the light emitted from the primary light source is incident and a light emitting face from which the light guided in the light guide is emitted;

a light deflector arranged adjacently to the light emitting face of the light guide and has a light entering face which the light emitted from the light emitting face of the light guide enters and a light exiting face located on the opposite side to the light entering face; and a direct light incoming prevention means composed of a light-blocking member, wherein the light-blocking member is arranged on a first region of the light emitting face of the light guide, the first region being located near an edge of the light emitting face on the side of the light incident end face, and prevents the light, which is emitted from the primary light source, from entering into the light deflector without passing through the light guide, a surface of the light-blocking member facing the light emitting face of the light guide is a diffusing reflective surface, and the light deflector is arranged on a second region of the light emitting face where the light-blocking member is not arranged.

In an aspect of the present invention, the light deflector is ranged so that at least a portion of the light deflector near the first region is in contact with the light emitting face of the light guide. In an aspect of the present invention, the light guide and the light deflector are connected to each other with an adhesive film, and a part of the adhesive film functions as a press member for making the portion of the light deflector near the first region be in contact with the light emitting face of the light guide.

In an aspect of the present invention, the primary light source, the light guide and the light deflector are set in a casing, a lid of transparency is attached to the casing adjacently to the light deflector, and the light-blocking member is attached to the lid. In an aspect of the present invention, the light deflector comprises a prism sheet and a light diffusing sheet disposed on the prism sheet. In an aspect of the present invention, the primary light source comprises at least one point light source. In an aspect of the present invention, the primary light source, the light guide and the light deflector are set in a casing, a lid of transparency is attached to the casing adjacently to the light exiting face of the light deflector, and there is attached to the lid a press member for making the portion of the light deflector near the first region be in contact with the light emitting face of the light guide. In an aspect of the present invention, the light deflector comprises a prism sheet and a light diffusing sheet disposed on the prism sheet. In an aspect of the present invention, the primary light source comprises at least one point light source.

According to the present invention, in order to achieve the above object, there is also provided a planar light source device comprising:

a primary light source;

a light guide guiding a light emitted from the primary light source and having a light incident end face on which the light emitted from the primary light source is incident and a light emitting face from which the light guided in the light guide is emitted;

a light deflector arranged adjacently to the light emitting face of the light guide and has a light entering face which the light emitted from the light emitting face of the light guide enters and a light exiting face located on the cite side to the light entering face; and a direct light incoming prevention means composed of a light-blocking member, wherein the light-blocking member is arranged on a first region of the light emitting face of the light guide, the first region being located near an edge of the light emitting face on the side of the light incident end face, and prevents the light, which is emitted from the primary light source, from entering into the light deflector without passing through the light guide, the light deflector is arranged on a second region of the light emitting face where the light-blocking member is not arranged, the light guide and the light deflector are connected to each other with an adhesive film, and the light-blocking member is composed of a part of the adhesive film.

In an aspect of the present invention, the adhesive film has a black surface located on the opposite side to a surface thereof facing the light emitting face of the light guide. In an aspect of the present invention, the primary light source, the light guide and the light deflector are set in a casing, an adhesive film connecting the light guide to the light deflector is connected to the casing, and the direct light incoming prevention means comprises a part of the adhesive film which functions as a press member for setting a position of the light guide so that a lighting portion of the primary light source faces the light incident end face of the light guide. In an aspect of the present invention, a surface of the light-blocking member facing the light emitting face of the light guide is a diffusing reflective surface. In an aspect of the present invention, the light deflector comprises a prism sheet and a light diffusing sheet disposed on the prism sheet. In an aspect of the present invention, the primary light source comprises at least one point light source.

BEST MODE FOR CARRYING OUT THE INVENTION

Preferred embodiments of the present invention will be described hereunder with reference to the accompanying drawings.

Figure 1:
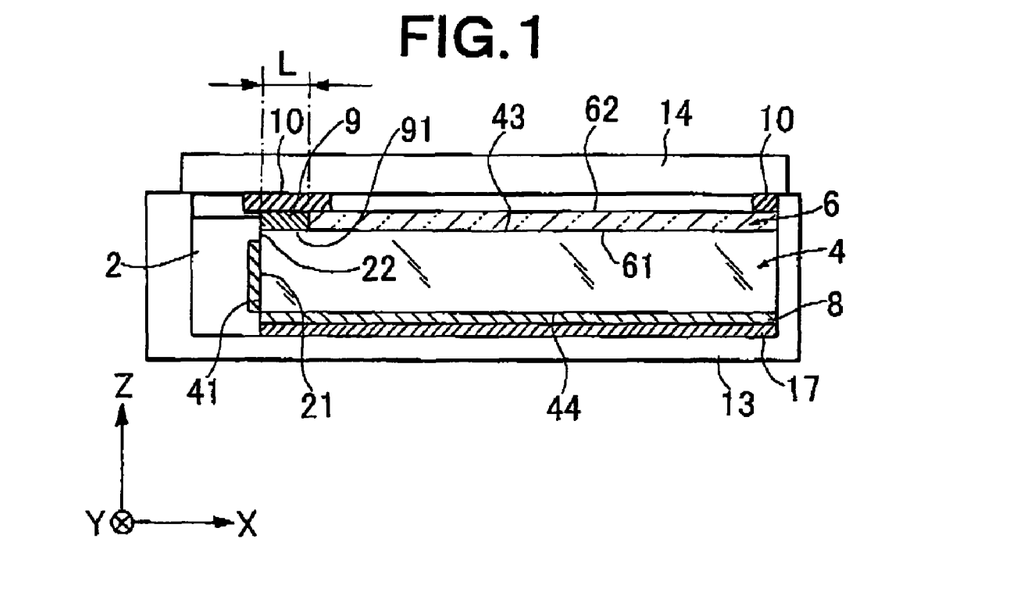
FIG. 1 is a schematic cross-sectional view showing an embodiment of a planar light source device of the present invention.
Figure 2:
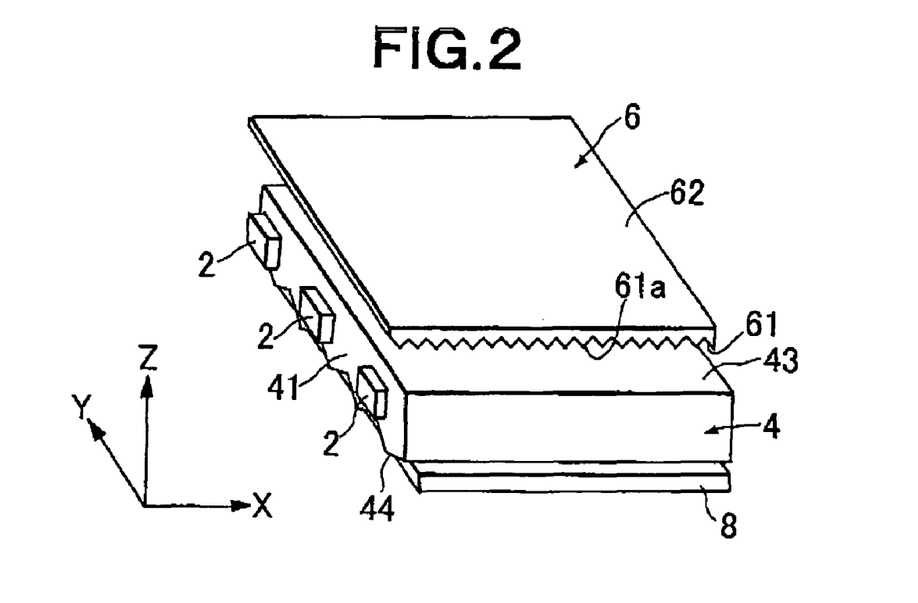
FIG. 2 is an exploded perspective view showing a portion of the constitution of the planar light source device of FIG. 1.

FIG. 1 is a schematic cross-sectional view showing an embodiment of a planar light source device of the present invention, and FIG. 2 is an exploded perspective view showing a portion of the constitution of the planar light source device of FIG. 1. As shown in FIGS. 1 and 2, the planar light source device of the embodiment comprises an LED 2 as a primary light source in a point state, a rectangular plate-like light guide 4 in an XY plane which makes a light emitted from the LED 2 incident on a light incident end face thereof, and guides the light therethrough to be emitted from a light emitting face thereof, and a light deflector 6 and a light reflector 8 both arranged adjacently to the light guide. The light guide 4 has two upper and lower principal surfaces, and four end faces for joining outer peripheries of the principal surfaces.

Figure 3:
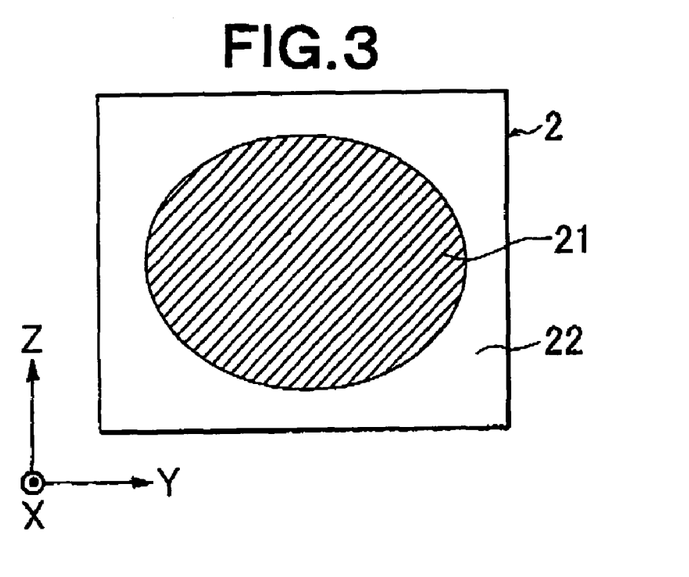
FIG. 3 is a schematic, enlarged front view showing an LED.

The LED 2 is arranged adjacently to one end face (light incident end face 41) of a pair of end faces of the light guide 4 substantially parallel to each other, while being arranged at a center of the end face in a Y direction and at two positions separated from the center in opposite directions by a fixed interval. According to the invention, the number of point light sources such as LED's which are primary light sources should preferably be set as small as possible with a view to achieving low power consumption. However, depending on a size of the light guide 4, or the like, a plurality of LED's may be arranged separately with fixed intervals or closely within short distance. FIG. 3 is a schematic, enlarged front view showing the LED 2. A front portion of the LED 2 comprises a lighting portion 21 and a non-lighting portion 22.

In the light guide 4, one principal surface (upper surface in the drawing) is set as a light emitting face or light outgoing face 43. On the light emitting face 43, a directive light emitting structure is formed to emit a light guided in or through the light guide 4 in a direction slanted with respect to the light emitting end face 43 (i.e., direction slanted with respect to the XY plane). As the directive light emitting structure, there is used a structure made of roughened surface or coarse surface (mat surface). The directive light emitting structure cause a directive light emission in a distribution within an XZ plane which includes both the normal direction (Z direction) of the light emitting face and an X direction perpendicular to a light incident end face or light incoming end face 41. An angle of the direction of a peak light in the distribution of light emitted from the light emitting face is in a range of 10 to 40° for example with respect to the light emitting face, and a half-value width of the emitted light distribution is in a range of 10 to 40° for example.

Figure 4:
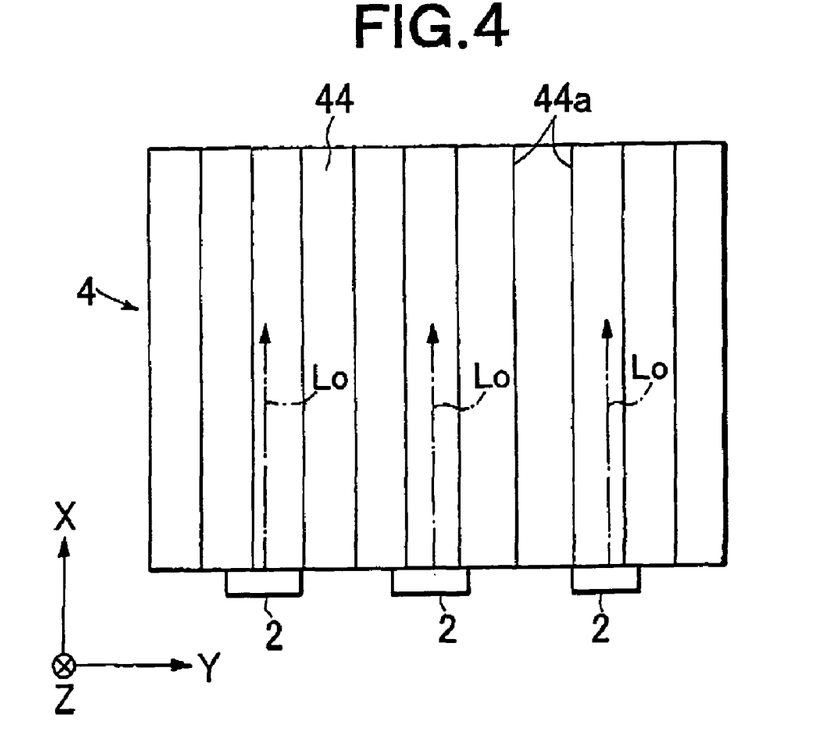
FIG. 4 is a bottom view showing the light guide of the planar light source device of FIG. 1 together with the primary light source.

The other principal surface (lower surface in the drawing) of the light guide 4 is set as an elongated lens formed surface 44. The elongated lens formed surface 44 has a number of elongated lenses arrayed in parallel with one another to extend substantially along a direction (direction of a light of maximum intensity in a light intensity distribution) of a directivity of a light emitted from the lighting portion of the LED 2 and entered the light guide 4. With the elongated lenses formed in such a direction, the light introduced into the light guide 4 is expanded in the XY plane so that there hardly occurs a dark area or dark part. For example, if a direction of the directivity of the light entered the light guide 4 is substantially in X direction, as shown in FIG. 4, the elongated lens formed surface 44 has the elongated lenses 44a arrayed in parallel with one another to extend substantially along the X direction (there is shown in FIG. 4 a ridgeline of each elongated lenses 44a and a light $L_0$ of maximum intensity in the intensity distribution of the light emitted from the LED 2 and entered the light guide 4).

The light deflector 6 is arranged on the light emitting face 43 of the light guide 4. Two principal surfaces of the light deflector 6 are positioned in parallel with the XY plane as a whole. One (principal surface facing the light emitting face 43 of the light guide) of the two principal surfaces is set as a light entering face 61, and the other surface is set as a light exiting face 62. The light exiting face 62 is a flat surface parallel to the light emitting face 43 of the light guide 4. The light entering face 61 is an elongated lens formed surface in which a number of elongated lenses 61a are arrayed in parallel with one another. The elongated lenses 61a of the light entering face 61 are arrayed in parallel with one another to extend substantially in perpendicular to the direction of the directivity of the light emitted from the LED 2 and entered the light guide 4.

Figure 5A:
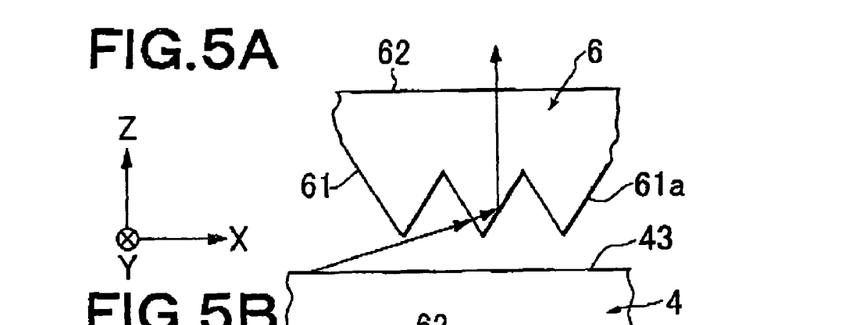
FIGS. 5A and 5B are views each showing a state of light deflection by a light deflector.

FIGS. 5A and 5B each shows a state of light deflection by the light deflector 6. FIG. 5A shows a traveling direction of a peak emission light (light corresponding to a peak of the emitted light distribution) from the light guide 4 in the XZ plane. The light obliquely emitted from the light emitting face 43 of the light guide 4 is incident on a first surface of the elongated prism 61a of the light deflector 6, and totally reflected on a second surface thereof to be emitted substantially in the normal direction of the light exiting face 62. In the YZ plane, the foregoing operation of the elongated lenses 44a of the light guide 4 enables sufficient improvement in luminance in the normal direction of the light exiting face 62.

Figure 5B:
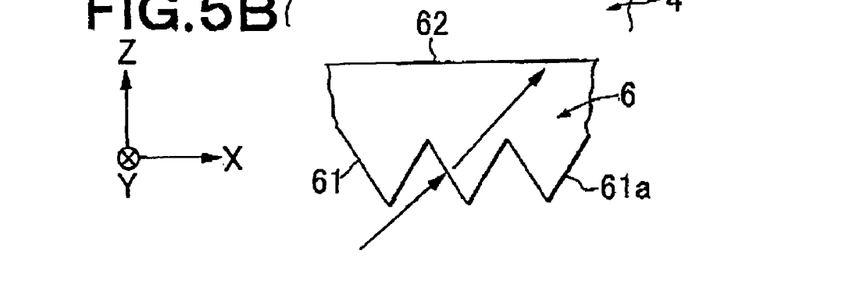

Here, the direct light incoming prevention means which prevents the light emitted from the primary light source from entering directly the light deflector, and which is a characteristic element in the present invention. When the light emitted from the LED 2, i.e. the primary light source, enters directly the light deflector 6, unlike the normal case where the light is introduced into the light deflector 6 as shown in FIG. 5A, it passes through the light deflector 6 with deflection and is emitted from the light exiting face 62 in a slant direction, as shown in FIG. 5B, to thereby cause a strong bright line observed when observing the planar light source device (backlight) in slant direction. Therefore, in the present invention, there is used the direct light incoming prevention means for preventing the light emitted from the primary light source 2 from entering directly the light deflector 6.

In the embodiment described with reference to FIGS. 1 to 4, 5A and 5B, since the thickness (dimension in the Z direction) of the light guide 4 at the light incident end face 41 is small, a portion of the primary light source 2 is positioned beyond the edge of the light incident end face 41 on the side of the light emitting face 43, i.e. over the level of the light emitting face 43. The light deflector 6 is arranged apart from the primary light source 2 by an interval of L. Since a light-blocking member 9 is arranged between the primary light source 2 and the light deflector 6, the light emitted from the primary light source 2 is prevented from directly entering the light deflector 6. That is, the direct light incoming prevention means comprises the light-blocking member 9 disposed at a first region of the width of L adjacent to the edge of the light emitting face 43 of the light guide 4 on the side of the light incident end face 41, and the light deflector 6 is disposed on a second region of the light emitting face 43 other than the first region where the light-blocking member 9 is arranged. The width L of the first region is preferably set to 0.1 mm or more, more preferably 0.5 mm or more, especially 1 mm or more. When the width L is excessively small, the light emitted from the primary light source 1 is introduced directly into the light deflector 6 with teased probability. Furthermore, in order to prevent the width of a bright band in the lighting area of the planar light source device based on the light reflected by the light-blocking member 9 from enlarging, to thereby prevent the bright band from being observed in the vicinity of the end portion of an effective lighting area F (explained later), it is preferable to set the width L of the first region to a value which is not excessively large so that the first region is not extended to the effective lighting area F. If the light-blocking member 9 is extended to an area adjacent to the effective lighting area F, the end portion of the light-blocking member 9 is occasionally projected to the light deflector 6 to thereby become observable through the light deflector 6. Accordingly, it is preferable to set the width L of the first region so that the first region is separated from the end portion of the effective lighting area F by 0.5 mm or more.

With use of the light-blocking member 9, the light emitted from the primary light source 2 can be surely prevented from being introduced directly into light deflector 6. A surface 91 of the light-blocking member 9 facing the light emitting face 43 of the light guide 4 is preferably reflective and in particular, has a high reflectivity. The reflectivity of the surface 91 is preferably set to 60% or more, more preferably to 80% or more, further preferably to 90% or more. In case of excessive low reflectivity of the surface 91, there is caused a loss of the light emitted from the light guide 4 and incident on the light-blocking member 9, to thereby lower the luminance. The surface 91 is preferably diffusingly reflective rather than regularly reflective.

In the present invention, with use of the light-blocking member 9 having the surface of diffusingly reflective, the light incident on the light-blocking member 9 can be reflected by the surface 91 thereof, so that unevenness of luminance in the vicinity of the primary light source LED 2 can be reduced more. As the diffusingly reflective surface, there can be used one which is roughened by etching or blasting method, another one which is a coated layer containing light diffusing particles such as titanium oxide particles or calcium carbonate particles, or the like. If an adhesive film is used as the light-blocking member as explained later, the adhesive film containing the light diffusing particles may be used as the diffusingly reflective surface.

Figure 6A:
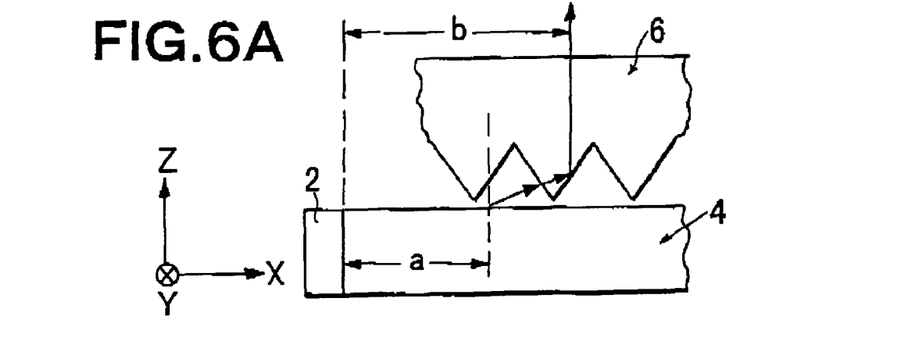
FIGS. 6A and 6B are views each showing a length of a dark part.
Figure 6B:
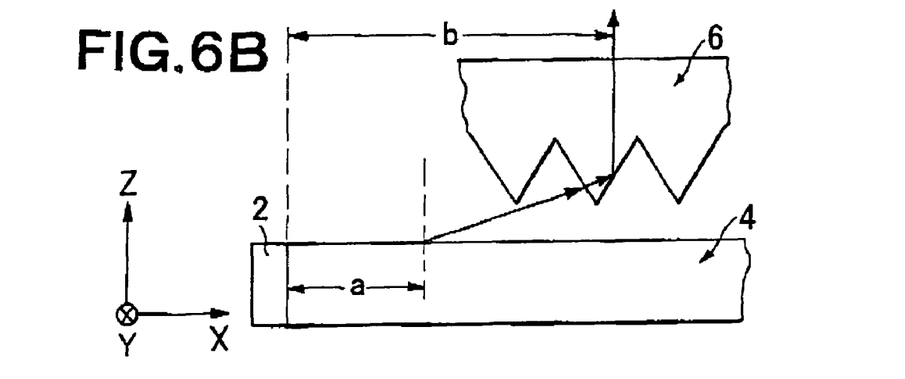

It is preferable to arrange the light-blocking member 9 so as not to prevent that the light guide 4 and the light deflector 6 are in contact with each other (i.e. the surfaces thereof contact each other). For example, when the light-blocking member is arranged between the light guide and the light deflector as explained with reference to FIG. 12, the light guide 104 and the light deflector 106 are not in contact with each other. Such a configuration is not preferable, because the length in X direction of the dark part formed between the adjacent primary light sources, etc. becomes long as explained with reference to FIG. 13, and therefore dark part is observed within the effective lighting area (The effective lighting area is a lighting area, F in FIG. 13, of the planar light source device, which corresponds to an area of a display element used actually as a screen when a display device is formed by using the planar light source device and the display element such as a liquid crystal display element, etc. in combination). This is because, when the length in the X direction of a dark part formed between the adjacent primary light sources 2 in the light emitting face 43 of the light guide 4 is set to "a" and the length in the X direction of a dark part formed in the light exiting face 61 of the light deflector 6 so as to correspond to the dark part of the light emitting face 43 is set to "b", a magnitude of the length b is greater in the case where the light guide 4 and the light deflector 6 are separated from each other in Z direction as shown in FIG. 6B than the case where the light guide 4 and the light deflector 6 are in contact with each other as shown FIG. 6A. In view of the above reasons, it is preferable that the light guide 4 and the light deflector 6 are in contact with each other at least in a region of the effective lighting area on the side adjacent to the primary light source 2. Accordingly, when arranging the light-blocking member 9, it is preferable that the contact between the light guide 4 and the light deflector 6 is not prevented and additionally there is provided a press member for severing the light guide 4 and the light deflector 6 in contact with each other.

In addition to the case where the light-blocking member 9 is arranged between the light guide 4 and the light deflector 6 as mentioned in the above, there is another case where the light guide 4 and light deflector 6 are not in contact with each other. That is, there are another case where the light deflector 6 having an elongated lens arrangement structure formed on the surface of a transparent substrate with active energy ray curable resin is used still another case where the light deflector 6 having small thickness is used, etc. In such light deflectors 6, a deformation such as bending, curling or the like easily occurs and there is formed an area where the light guide 4 and the light deflector 6 are not in contact with each other. Therefore, it is preferable to use the above press member.

In order to allow the light emitted from the primary light source 2 to be introduced into the light guide 4 with excellent efficiency, it is preferable that substantially all region of the lighting portion 21 of the primary light source 2 is in contact with the light incident end face 41 of the light guide 4. As the primary light source, the LED is preferably used as in the present embodiment. It is to be noted, however, the primary light source is not restricted thereto in the present invention. As shown in FIG. 3, the LED has a lighting portion 21 in the central area and a non-lighting area 22 in the peripheral area. Lighting is made predominantly in the lighting portion. However, there is a light coming out of the non-lighting portion 12. When the lighting portion 21 and the light incident end face 41 of the light guide 4 are shifted from each other in the Z direction, or when the lighting portion 21 and the light incident end face 41 of the light guide 4 are not in contact but are separated with each other, there is a case where the amount of light introduced into the light guide 4 is reduced to thereby lower the luminance. Also in a case where only the non-lighting portion 22 of the primary light source 2 is positioned higher than the upper edge of the light incident end face 41 of the light guide 4, the light coming out of the non-lighting portion 22 may be directly introduced into the light deflector 6 to thereby cause the above bright line. For this case, the direct introduction of the light into the light deflector 6 can be prevented with use of the means as mentioned above. Therefore, in case of the thickness of the light guide 4 on the side of the light incident end face is smaller than the width of the primary light source 2, it is preferable to position the light guide 4 so that only the non-lighting portion 22 does not correspond to the light incident end face 41 of the light guide 4, and to use a positioning means for such purpose.

There will be explained in below regarding a press member for positioning the light-blocking member 9 and the light deflector 6 relative to the primary light source 2 in most preferable relationship, and a press member having a function for letting the light deflector 6 be in contact with the light guide 4.

In the embodiment of FIG. 1, etc., the primary light source 2, light guide 4, light deflector 6 and the light reflector 8 are set in the casing 13 to which the lid 14 is attached. The lid 14 is transparent so as to allow the light emitted from the light deflector 6 to pass therethrough. In this embodiment, the press member 10 may be attached to a portion of the lid 14. The press member 10 is in contact with the light deflector 6 and push it toward the light guide 4 so as to be in contact therewith. The light-blocking member 9 may be attached to the press member 10. The surface of light-blocking member 9 facing the light guide 4 preferably has high reflectivity. Therefore, it is preferable that the light-blocking member 9 is entirely made of a material of high reflectivity, or a coating material is applied to at least the surface 91 of light-blocking member 9 facing the light guide 4. The press member 10 attached to the lid 14 is positioned outside the effective lighting area, that is, so as to correspond to the peripheral portion of the light deflector 6. In addition, as shown in FIG. 1, a spacer 17 may be arranged on the bottom surface of the casing 13 if necessary. The lid 14 is allowed to engage with the casing 13, so that the light guide 4, light deflector 6 and the light reflector 8 are pressed downwards with the press member 10, to thereby precisely set the positional relationship between the lighting portion 21 of primary light source 2 and the light incident end face 41 of the light guide 4.

FIGS. 7 to 10 are schematic cross-sectional views showing embodiments of the planar light source device of the present invention. In these figures, members or portions having functions similar to those described in FIGS. 1 to 4, 5A, 5B, 6A and 6B are denoted by the same reference numerals.

Figure 7:
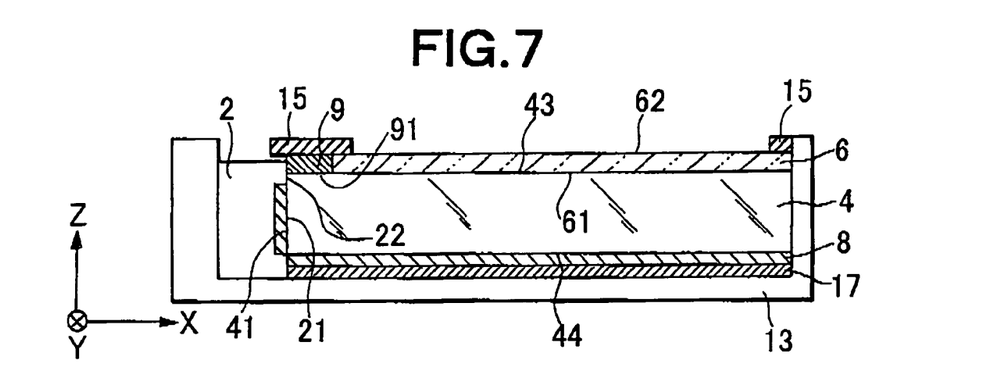
FIG. 7 is a schematic cross-sectional view showing an embodiment of the planar light source device of the present invention.

In the embodiment of FIG. 7, the primary light source 2, light guide 4, light deflector 6 and the light reflector 8 are set in the casing 13 and fixed thereto by an adhesive film (adhesive tape) 15. In this case, it is preferable that the adhesive tape 15 also acts as the light-blocking member 9. Alternatively, an adhesive tape 15 other than the light-blocking member 9 is a so as to function as the press member. Furthermore, if necessary, a spacer 17 may be arranged on the bottom surface of the casing 13. By pressing the above constituent members downwards with the tape 10 used as the press member, there can be precisely set the positional relationship, especially in the Z direction, between the lighting portion 21 of primary light source 2 and the light incident end face 41 of the light guide 4.

Figure 8:
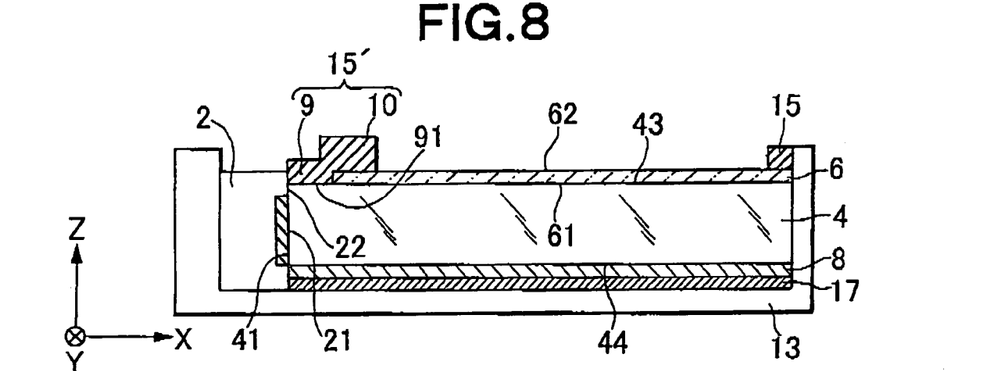
FIG. 8 is a schematic cross-sectional view showing an embodiment of the planar light source device of the present invention.
Figure 9:
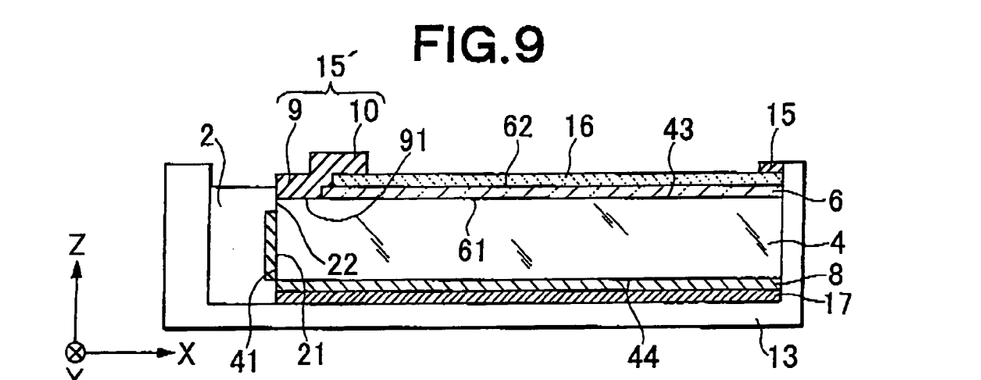
FIG. 9 is a schematic cross-sectional view showing an embodiment of the planar light source device of the present invention.

In the embodiment of FIG. 8, a tape 15' functions as both the light-blocking member 9 and the press member 10. In the embodiment of FIG. 9, a tape 15' functions as both the light-blocking member 9 and the press member 10, the prism sheet 6 on which a light diffusing sheet 16 is additionally formed is used as the light deflector, and both the prism sheet 6 and the light diffusion sheet 16 are pressed and fixed by the tape 15'.

Also in these embodiments, the surface 91 of light-blocking member 9 facing the light guide 4 preferably has high reflectivity. Therefore, it is preferable that the adhesive tapes 15, 15' are entirely made of a material of high reflectivity, at least a portion of each of the adhesive tapes 15, 15' functioning as the light-blocking member 9 is made of a material of high reflectivity, or at least an area, which faces the light guide 4, of the portion of the adhesive tapes 15, 15' functioning as the light-blocking member 9 is made of a material of high reflectivity.

It is preferable to use the adhesive tapes 15, 15' having a surface, which is coated in black, on the opposite side to the surface facing the light guide 4. The above-described functions can be achieved by applying the coating material having high reflectivity only to the portion of black tapes 15, 15' functioning as the light blocking member 9 and facing the light guide. When the surface 91 of the adhesive tapes 15, 15' facing the light emitting face 43 of the light guide 4 is made as diffusingly reflecting surface, there may be used a coating material having high reflectivity or diffusing particles contained in the adhesive layer.

With use of the above adhesive tapes 15, 15', the light guide 4 and the light deflector 6 are retained in contact with each other even if the casing is not used for the purpose of lightening the portable electronic devices.

Figure 10:
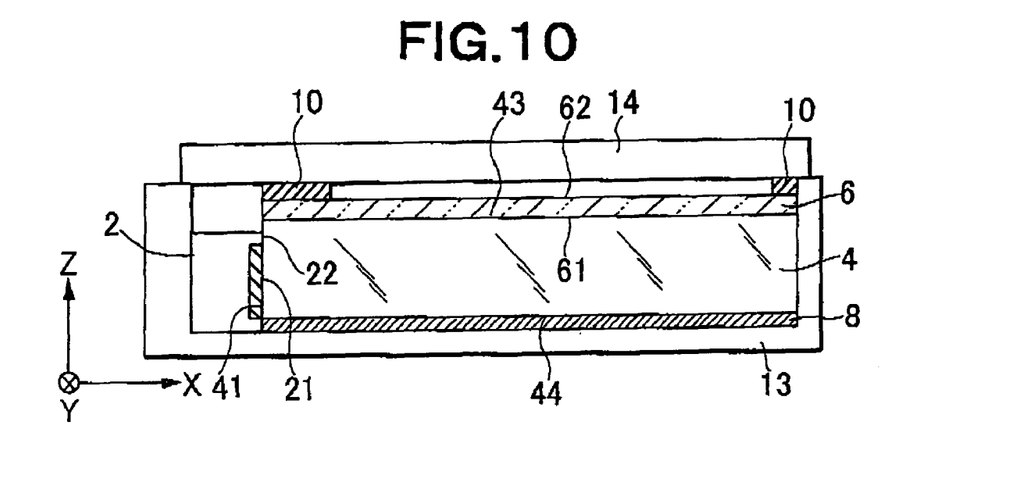
FIG. 10 is a schematic cross-sectional view showing an embodiment of the planar light source device of the present invention.

In the embodiment of FIG. 10, the press member 10 sets the position of the light guide so that the lighting portion 21 of the primary light source 2 faces the light incident end face 41 of the light guide 4. In particular, the lighting portion 21 and non-lighting portion 22 of the primary light source 2 are entirely positioned below an edge of the light incident end face 41 of the light guide 4 on the side of the light emitting face 43. With such an arrangement, the light causing the bright line as shown in FIG. 5B does not occur, because the light emitted from the primary light source 2 is not directly introduced into the light deflector 6.

The light guide and light deflector of the planar light source device of the present invention will be described in more detail hereunder.

In the roughened surface or elongated lens formed surface of the light guide 4 provided for a directive light emitting structure, an average slant angle θa by ISO4287/1-1984 is preferably set to a range of 0.5° to 15° in order to achieve an improvement in uniformity of luminance in the light emitting face 43. The average slant angle θa is in a range of more preferably 1° to 12°, further preferably 1.5° to 11°. An optimum range of the average slant angle θa is preferably set in accordance with a ratio (L/t) of a length (L) in a direction in which the incident light propagates in the light guide relative to a thickness (t) of the light guide. That is, when the light guide having L/t of about 20 to 200 is used, the average slant angle θa is set to a range of preferably 0.5 to 7.5°, more preferably 1° to 5°, further preferably 1.5° to 4°. When the light guide 43 having L/t of about 20 or less is used, an average slant angle θa is set to a range of preferably 7° to 12°, more preferably 8° to 11°.

The average slant angle θa of the roughened surface formed on the light guide 4 can be obtained by measuring roughened surface shapes with use of a probe type surface roughness tester, obtaining a slant function f(x) with a coordinate of a measuring direction set as x, and executing a calculation with the following equations (1) and (2), in accordance with ISO 4287/1-1984. Here, L is a measured length, and Δa is a tangent of the average slant angle θa.

$$\Delta a = (1/L) \int_0^L |(d/dx)f(x)| dx \quad (1)$$

$$\theta a = \tan^{-1}(\Delta a) \quad (2)$$

In the present invention, instead of or in addition to the directive light emitting structure formed on the light emitting face 43 or the rear surface 44, there may be provided a directive light emitting function by dispersing light diffusing fine particles in the light guide.

The surface (lower surface in the drawing) of the light guide 4 on the opposite side to the surface having the directive light emitting structure is made in the elongated lens formed surface 44. The elongated lens formed surface 44 has a number of elongated lenses arrayed in parallel with one anther to extend substantially along the direction (direction of n intensity light in the light intensity distribution) of the directivity of the light emitted from the LED and entered the light guide 4. The elongated lenses function to expand the light introduced in the light guide 4 in the XY direction to thereby reduce occurrence of the dark part.

As shown in FIG. 2, when the elongated lenses 44a are formed on the rear surface 44 or light emitting face 43 of the light guide 4, the shape of the cross section of the elongated lenses 44a in a plane perpendicular to the extending direction of the elongated lenses is preferably a lenticular shape, triangular shape, substantially triangular shape with a rounded apex, substantially triangular shape with a beveled apex, or the like.

The average slant angle of the cross-sectional shape of the above elongated lenses 44a in a plane perpendicular to the extending direction of the elongated lenses, which is defined relative to an elongated lens formed plane 44 is preferably set in a range of 10 to 60°, more preferably in a range of 15 to 50°, further preferably in a range of 25 to 45°. It is because if the average slant angle is out of the above range, the function for expanding the light emitted from the light source 2 and introduced into the light guide 4 and thus reducing occurrence of the dark part tends to be lowered.

According to the present invention, the direction of the elongated lenses 44a may be shifted from the direction of the directivity of the light introduced into the light guide 2 within a range of not greatly damaging an effect of expanding the light. In this case, the direction of the elongated lenses 44a is preferably set in a range of 20° or less with respect to the direction of the directivity of the light introduced into the light guide, more preferably in a range of 10° or less.

Further, for the light guide 4, a light emission ratio is preferably set in a range of 0.5 to 5%, more preferably in a range of 1 to 3%. It is because if the light emission ratio is less than 0.5%, there is a tendency that the amount of a light emitted from the light guide 4 becomes small to disable acquisition of sufficient luminance, and if the light emission ratio exceeds 5%, there is a tendency that a large amount of light is emitted near the primary light source 2, and considerable light attenuation occurs in the X direction in the light emitting face 43 to cause a reduction in uniformity of luminance thereon. Thus, by setting the light emission ratio of the light guide 4 in the range of 0.5 to 5%, it is possible to provide a planar light source device of high luminance that can emit a light of highly directive light emitting characteristics from the light guide 4 in which an angle of a peak light emitted from the light emitting face in the luminous intensity distribution of light in the XZ plane is in a range of 50 to 90° with respect to the normal of the light emitting face, and a half-value width of the emitted light luminous intensity distribution in the XZ plane is in a range of 10 to 40°, and can efficiently deflect the light emitting direction thereof by the light deflector 6.

According to the present invention, the light emission ratio of the light guide 4 is defined as follows. A relation between intensity ($I_o$) of an emitted light from the light emitting face 43 at a position of the light incident end face 31 and intensity (I) of an emitted light from the light emitting face 43 at a position of a distance L from the light incident end face satisfies the following equation (3) if a thickness (Z-direction size) of the light guide 4 is t:

$$I = I_0 \alpha (1-\alpha)^{L/t} \quad (3)$$

Here, a constant α is the light emission ratio, which is a percentage (%) of light emitted from the light guide 4 per unit length (length equivalent to the thickness t of the light guide) in the X direction, which is in perpendicular to the light incident end face 41, on the light emitting face 43. The light emission ratio a can be obtained from a gradient of a line obtained by plotting the relation between a logarithm of light intensity of the light emitted from the light emitting face 43 on an ordinate and (L/t) on an abscissa.

In order to expand the incident light in the XY plane to thereby reduce the dark part occurring between the adjacent primary light sources 2, it is preferable to provide a number of elongated lenses or grooves extending substantially in the Z direction on the light incident end face 41 of the light guide 4, or to roughen the light incident end face 41. The average slant angle in the Y direction of the light incident end face 41 formed as the above manner is preferably 3 to 30°, more preferably 4 to 25°, further preferably 5 to 20°. It is because if the average slant angle is smaller than 3°, the function for expanding the light in the XY plane is insufficient, and if the average slant angle is greater than 30°, the luminance lowers while additional expansion of the light in the XY plane cannot be achieved.

The light guide 4 is not restricted to one which has the cross section shown in FIG. 1, but may be ones which have various cross section such as wedge shaped cross section, boat shaped cross section in which the thickness of the light guide is reduced as approaching from the both side portions to the central portion, or the like.

The light guide 4 of the present invention can be made of highly light-transmissive synthetic resins. As such synthetic resins, for example, a methacrylic resin, an acrylic resin, a polycarbonate resin, a polyester resin, a vinyl chloride resin, and a cyclic polyolefin resin are available.

Especially, the methacrylic resin is most suitable because of its high light transmittance, heat resistance, dynamic characteristics, and molding processability. As such a methacrylic resin, a resin that mainly contains methyl methacrylate by 80 wt % or more is preferable. For forming a surface structure of the roughened surface, elongated prism formed surface, or the like of the light guide 4, such a structure may be for by subjecting a transparent synthetic resin to hot pressing which uses a mold of a desired surface structure, or a shape may be imparted by screen printing, extrusion molding, injection molding or the like simultaneously with molding of the light guide. Additionally, a structure surface can be formed by using a thermosetting resin, a photosetting resin or the like. As the method for partially changing the shape of the elongated lens 44a formed on the light guide according to the present invention, there is exemplified a method of blasting a portion or all of the surface of a mold having an elongated lens shape processed by cutting or etching, a method of grinding a portion or all of the surface of a mold having an elongated lens shape and transforming the shape of the mold, a method of manufacturing a molded product by transformation of the shape of a first mold having an elongated lens shape, blasting a portion or all of the surface of the molded product, and then transforming the shape of the molded product to obtain a second mold, or the like.

As the method for forming the elongated lens formed surface or roughened surface of the light emitting structure of the light guide, there is exemplified a cutting, etching, blasting, or a combination thereof for the mold.

Figure 11A:
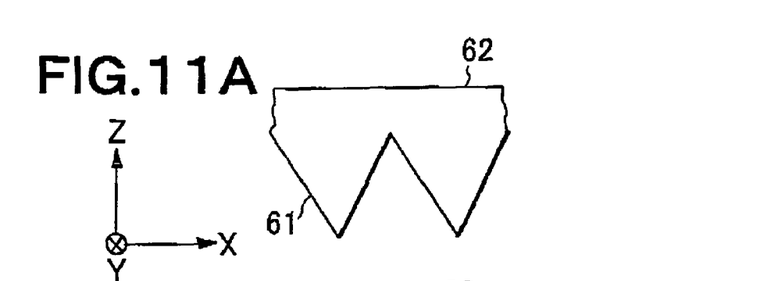
FIGS. 11A, 11B and 11C are views each showing a modification of shape of a prism sheet.
Figure 11B:
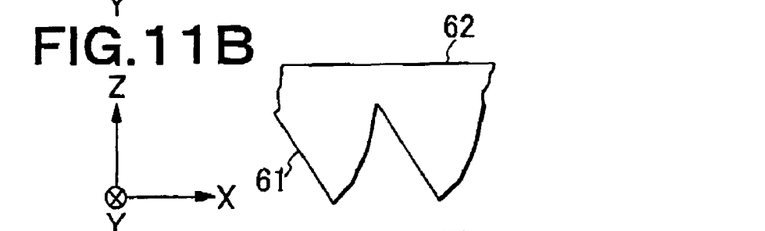
Figure 11C:
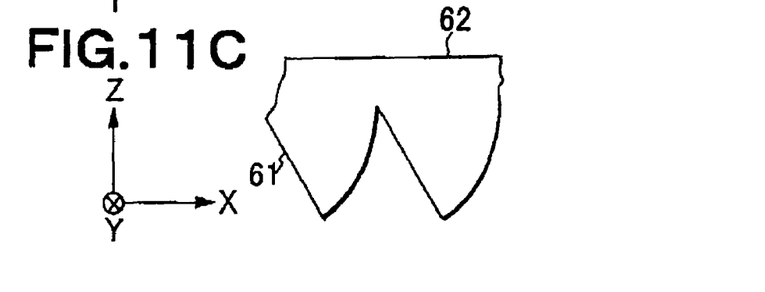

Various kinds of shapes of the elongated lenses formed on the light deflector 6 are used in accordance with purposes. Among them, the prism sheet on which a number of elongated prisms substantially triangular in cross section is especially preferable. The apex angle of the elongated prism is preferably set to a range of 50 to 80°, more preferably a range of 50 to 70°. In order to change the direction of the light emitted from the light deflector 6, as shown in FIG. 11A, the may be used an anisotropic prism which has two prism faces having different angles relative to the light exiting face 62. Furthermore, in order to regulate a viewing angle, there is preferably used an elongated prism in which the straight line of the triangular cross section is deformed. Especially, there is exemplified an elongated prism in which the straight line of the triangular cross section is made to a combination of straight lines having different inclination angles as shown in FIG. 11B, an elongated prism in which the straight line of the triangular cross section is made to an outwardly convex arc as shown in FIG. 11C, an elongated prism in which the straight line of the triangular cross section is made to a combination of curved lines having different radius of curvature. With a combination of the straight line and curved line, the light can be emitted in more concentrated manner toward the observer to thereby increase the luminance.

The light deflector 6 of the present invention can be made of highly light-transmissive synthetic resins. As such synthetic resins, for example, a methacrylic resin, an acrylic resin, a polycarbonate resin, a polyester resin, a vinyl chloride resin, ad a cyclic polyolefin resin are available. Especially, the methacrylic resin is most suitable because of its high light transmittance, heat resistance, dynamic characteristics, and molding processability. As such a methacrylic resin, a resin that mainly contains methyl methacrylate by 80 wt % or more is preferable. For forming a surface structure of the roughened surface, elongated prism formed surface, or the like of the light deflector 6, such a structure may be formed by subjecting a transparent synthetic resin to hot pressing which uses a mold of a desired surface structure, or a shape may be imparted by screen printing, extrusion molding, injection molding or the like simultaneously with molding of the light deflector. Additionally, a structure surface can be formed by using a thermosetting resin, a photosetting resin or the like. The mold can be manufactured by cutting method, etching method, or the like. Further, a roughened surface structure or an elongated lens arraying structure made of an active energy curable resin may be formed on a transparent base material such as a transparent film, sheet or the like made of a polyester resin, an acrylic resin, a polycarbonate resin, a vinyl chloride resin, a polymethacrylic imido resin or the like. Alternatively, such a sheet may be bonded to another transparent base material to be integrated by a method of adhesion, fusion or the like. As the active energy curable resin, a multifunctional (meth)acrylic compound, a vinyl compound, (meth)acrylic acid ester, an aryl compound, metal salts of (meth)acrylic acids or the like can be used.

As the light reflector 8, for example, a plastic sheet having a metal evaporated reflecting layer on its surface may be used. In the present invention, there may be used, instead of the reflective sheet, as the light reflector 8 a light reflecting layer of evaporated metal formed on the main surface 44 of light guide on the opposite side to the light emitting face. A reflecting member is preferably attached to three end faces (excluding the light incident end face 41) of the light guide 4.

In the present invention, when a point light source is used as the primary light source, it is preferable to use a plurality of point light sources arranged so as to face the end face of the light guide 4 while being separated from each other with a predetermined interval. Example of the primary light source 2 is an LED. In such a case, the plurality of point light sources are preferably arranged so that the directions of peak light emitted from the primary light sources are in parallel to each other. It is preferable to set the interval between the primary light source 2 such as LED and the light incident end face 41 of the light guide to 0.2 mm or less. If the interval between the primary light source 2 and the light incident end face 41 exceeds 0.2 mm, the luminance tends to become lower.

INDUSTRIAL APPLICABILITY

As explained in the above, according to the present invention, there is provided a high-quality planar light source device capable of avoiding appearance of the bright line and appearance of the dark part at an area between the adjacent LED's, etc. observed within the effective lighting area of the planar light source device, and of efficiently introducing the light emitted from the primary light source such as LED, etc. into the light guide, even if the light guide is made thin and light. Especially, the present invention is suitable for the planar light source device having the point light source such as LED for use in the liquid crystal display device of relatively small screen size such as portable electronic device, e.g. cellular phone, portable game machine, etc., and provides the high-quality planar light source device free from bright line or dark part even if the casing for setting the constituent member of the planar light source device therein.

What is claimed is:

1. A planar light source device comprising:
a primary light source;
a light guide guiding a light emitted from the primary light source and having a light incident end face on which the light emitted from the primary light source is incident and a light emitting face from which the light guided in the light guide is emitted;
a light deflector arranged adjacently to the light emitting face of the light guide and has a light entering face which the light emitted from the light emitting face of the light guide enters and a light exiting face located on the opposite side to the light entering face; and
a direct light incoming prevention means composed of a light-blocking member
wherein the light-blocking member is arranged on a first region of the light emitting face of the light guide, the first region being located near an edge of the light emitting face on the side of the light incident end face, and prevents the light, which is emitted from the primary light source, from entering the light deflector without passing through the light guide, a surface of the light-blocking member facing the light emitting face of the light guide is a diffusing reflective surface, and the light deflector is arranged on a second region of the light emitting face where the light-blocking member is not contacting the light emitting face and the light deflector is sandwiched between the light-blocking member and the light emitting face, and wherein the light-blocking member contacts a portion of the light exiting face of the light deflector.

2. The planar light source device as claimed in claim 1, wherein the light deflector is arranged so that at least a portion of the light deflector near the first region is in contact with the light emitting face of the light guide.

3. The planar light source device as claimed in claim 2, wherein the light guide and the light deflector are connected to each other with an adhesive film, and a part of the adhesive film functions as a press member for making the portion of the light deflector near the first region be in contact with the light emitting face of the light guide.

4. The planar light source device as claimed in claim 1, wherein the primary light source, the light guide and the light deflector are set in a casing, a lid of light transparency is attached to the casing adjacently to the light deflector, and the light-blocking member is attached to the lid.

5. The planar light source device as claimed in any one of claims 1 to 4, wherein the light deflector comprises a prism sheet and a light diffusing sheet disposed on the prism sheet.

6. The planar light source device as claimed in any one of claims 1 to 4, wherein the primary light source comprises at least one point light source.

7. The planar light source device as claimed in any one of claims 2 to 4, wherein the primary light source, the light guide and the light deflector are set in a casing, a lid of light transparency is attached to the casing adjacently to the light exiting face of the light deflector, and there is attached to the lid a press member for making the portion of the light deflector near the first region be in contact with the light emitting face of the light guide.

8. The planar light source device as claimed in claim 7, wherein the light deflector comprises a prism sheet and a light diffusing sheet disposed on the prism sheet.

9. The planar light source device as claimed in claim 7, wherein the primary light source comprises at least one point light source.

10. A planar light source device comprising:
a primary light source;
a light guide guiding a light emitted from the primary light source and having a light incident end face on which the light emitted from the primary light source is incident and a light emitting face from which the light guided in the light guide is emitted;
a light deflector arranged adjacently to the light emitting face of the light guide and has a light entering face which the light emitted from the light emitting face of the light guide enters and a light exiting face located on the opposite side to the light entering face; and
a direct light incoming prevention means composed of a light-blocking member,
wherein the light-blocking member is arranged on a first region of the light emitting face of the light guide, the first region being located near an edge of the light emitting face on the side of the light incident end face, and prevents the light, which is emitted from the primary light source, from entering the light deflector without passing through the light guide, the light deflector is arranged on a second region of the light emitting face where the light-blocking member is not contacting the light emitting face and the light deflector is sandwiched between the light-blocking member and the light emitting face, the light guide and the light deflector are connected to each other with an adhesive film, and the light-blocking member is composed of a part of the adhesive film, and wherein the light-blocking member contacts a portion of the light exiting face of the light deflector.

11. The planar light source device as claimed in claim 10, wherein the adhesive film has a black surface located on the opposite side to a surface thereof facing the light emitting face of the light guide.

12. The planar light source device as claimed in claim 10, wherein the primary light source, the light guide and the light deflector are set in a casing, an adhesive film connecting the light guide to the light deflector is connected to the casing, and the direct light incoming prevention means comprises a part of the adhesive film which functions as a press member for setting a position of the light guide so that a lighting portion of the primary light source faces the light incident end face of the light guide.

13. The planar light source device as claimed in any one of claims 10 to 12, wherein a surface of the light-blocking member facing the light emitting face of the light guide is a diffusing reflective surface.

14. The planar light source device as claimed in any one of claims 10 to 12, wherein the light deflector comprises a prism sheet and a light diffusing sheet disposed on the prism sheet.

15. The planar light source device as claimed in any one of claims 10 to 12, wherein the primary light source comprises at least one point light source.

* * * * *